May 17, 1932.  O. M. EDWARDS  1,859,080
VENTILATING WINDOW FOR AUTOMOBILES
Original Filed July 28, 1927  2 Sheets-Sheet 1
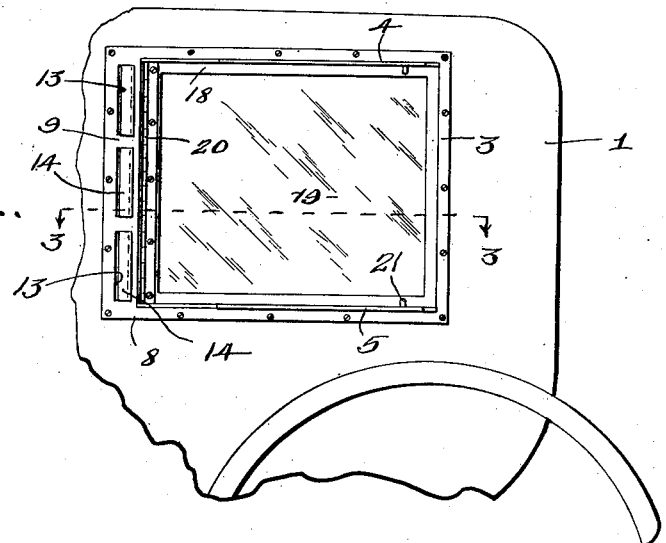
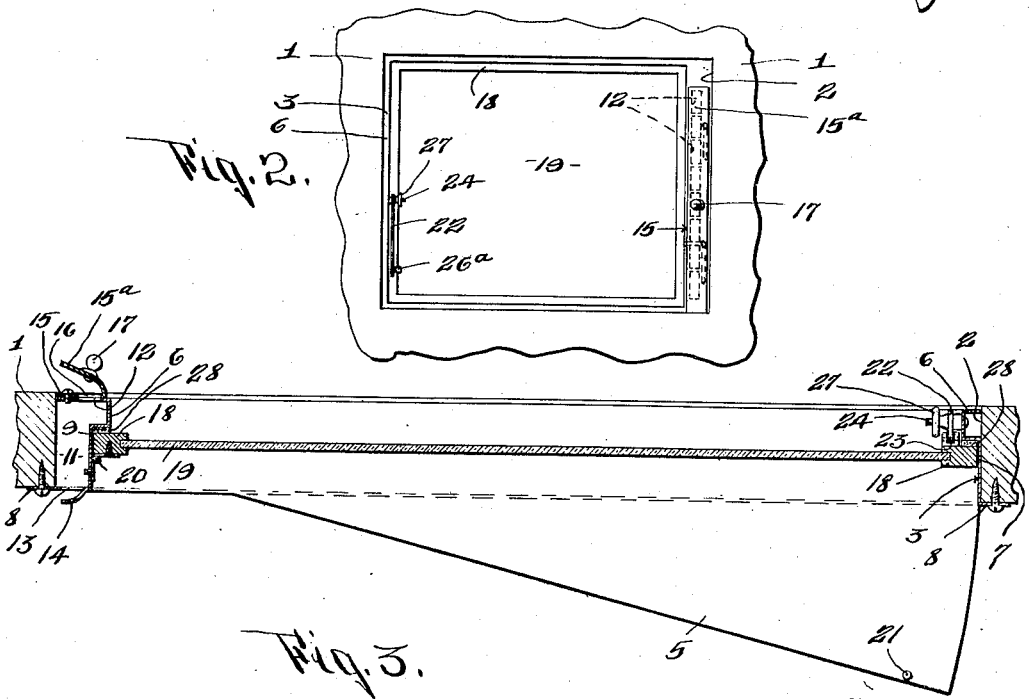
INVENTOR.
Oliver M. Edwards.
BY
Parsons & Bodell.
ATTORNEYS.

May 17, 1932.  O. M. EDWARDS  1,859,080
VENTILATING WINDOW FOR AUTOMOBILES
Original Filed July 28, 1927   2 Sheets-Sheet 2
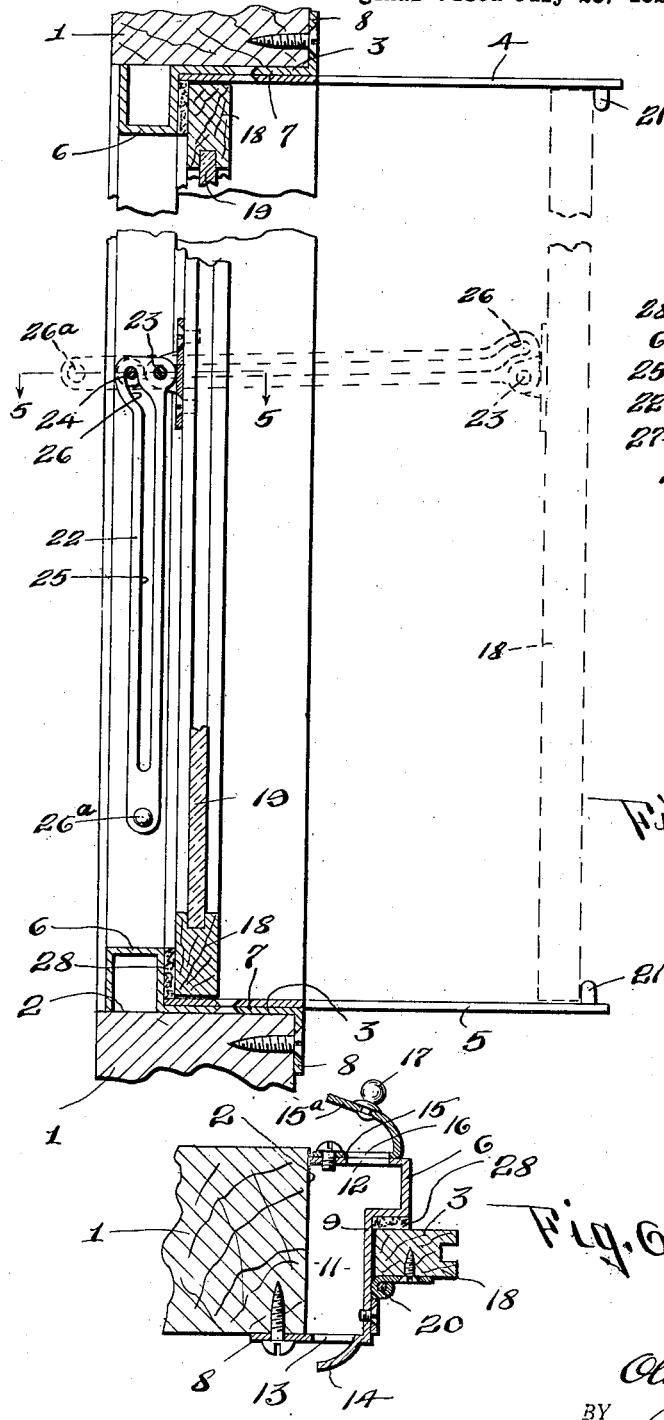
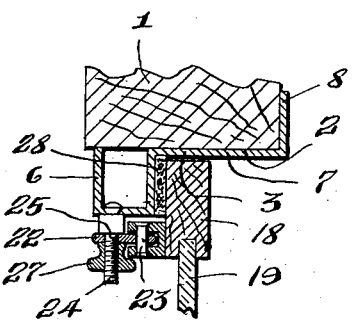
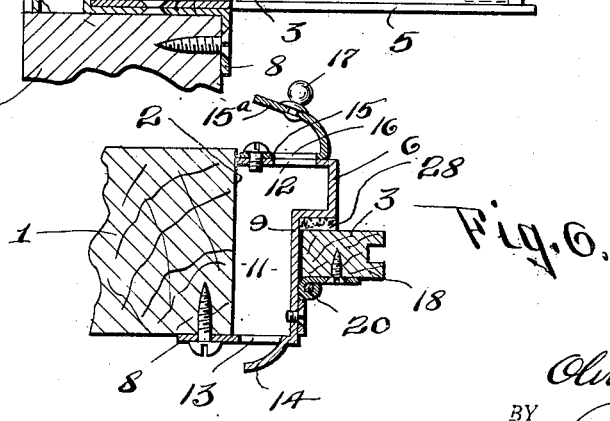
INVENTOR.
Oliver M. Edwards
BY Parsons & Bodell
ATTORNEYS.

Patented May 17, 1932

1,859,080

UNITED STATES PATENT OFFICE

OLIVER M. EDWARDS, OF SYRACUSE, NEW YORK, ASSIGNOR TO THE O. M. EDWARDS COMPANY, INC., OF SYRACUSE, NEW YORK, A CORPORATION OF NEW YORK

VENTILATING WINDOW FOR AUTOMOBILES

Application filed July 28, 1927, Serial No. 209,135. Renewed August 10, 1931.

This invention relates to window construction for automobiles and has for its object a particularly simple and efficient arrangement of one or more of the side windows and preferably, the rear side windows of an automobile body, whereby the air is withdrawn from the automobile body, that is, whereby the automobile body is ventilated particularly when the windshield cowl ventilator or another window is open without creating an appreciable draft in the rear of the vehicle and particularly the draft which heretofore has deflected from the top, rear wall and window of the body against the heads and backs of the occupants of the rear seat.

The invention consists in the novel features and in the combinations and constructions hereinafter set forth and claimed.

In describing this invention, reference is had to the accompanying drawings in which like characters designate corresponding parts in all the views.

Figure 1 is a fragmentary side elevation of an automobile body provided with one embodiment of my invention.

Figure 2 is a rear elevation of parts seen in Figure 1.

Figure 3 is a transverse horizontal sectional view taken on line 3—3, Figure 1.

Figure 4 is an enlarged fragmentary rear elevation, partly broken away of parts seen in Figure 3.

Figure 5 is a sectional view taken on line 5—5, Figure 4 of the operating means and contiguous parts.

Figure 6 is an enlarged fragmentary view of a portion of Figure 3.

This invention comprises generally, a sash pivoted at its front end on a vertical axis in the window opening of the automobile body, whereby its rear end is movable laterally outwardly and inwardly and means including an operating member located within the body. In addition, the invention includes upper and lower weather plates for closing the spaces between the upper and lower edges of the sash and the body when the sash is open.

Also, the invention comprises ventilating means forming part of the window frame construction for ventilating the body more or less when the sash is closed.

1 designates the automobile body having a window opening 2 therein, this window construction being shown as applied to each rear side window, that is, the window at each end of the rear seat of the vehicle.

The window construction is composed of a frame 3 which is set as a unit in the window opening of the automobile body and upper and lower weather plates 4, 5 secured to the frame 3 and extending laterally outwardly therefrom. This frame 3 is preferably formed up of sheet metal to form an inner stop 6 and a portion 7 fitting the sash and also a flange 8 for lapping the outer face of the wall around the window opening. The upper and lower and front upright frame members are of the same general form and fit the framing of the body as shown at the right hand end of Figure 3 and the rear member 9 of the window frame is shown as so applied to the body as to form an internal chamber 11 as illustrated at the left hand end of Figure 3 and this upright window frame member 9 is provided with slots 12 through the wall on the inner side thereof and also with slots 13 on the outer side thereof, and the meta' struck up to form the slots 13 is merely displaced and not removed and left to form scoops 14 directed toward the front of the vehicle so as to deflect air through the slots 13 and into the interior 11 of the frame member 9 and when desired, through slots 12 into the body of the automobile.

The slots 12 may be opened and closed by a suitable closure or slide 15 having slots 16 arranged to come into and out of register with the slots 12 and provided with a scoop 15ª similar to the scoops 14, the slide 15 being movable vertically and having a handle portion 17. The slide is held in position in any suitable manner. The weather plate 5 laps the sill portion 7 of the lower frame member and is secured thereto in any suitable manner as by welding. Similarly, the upper weather plate 4 laps the corresponding portion 7 of the upper rail of the window frame.

18 designates the sash which includes a suitable marginal frame for supporting a glass pane 19, the sash 18 being pivoted preferably by a piano hinge 20 at its front end to the upright frame portion 9 and movable laterally about its hinge. One or both of the weather plates 4 or 5 is provided with a suitable stop pin 21 to limit the outward movement of the sash.

The means for swinging the sash includes an operating member located on the interior of the automobile body and normally arranged in a position flatwise relatively to the sash and movable into an extended position when the sash is open so that it does not project into the car body either when the window is closed or opened.

The operating means as here shown includes a lever or link 22 pivoted at 23 to the rear stile of the sash 18 and also having a pivotal or a fulcrum connection at a point 24 independently of the sash, the lever being normally located so that it lies flatwise along the window frame and on the window stop portion of the rear upright member of the window frame. The lever 22 is formed with a lengthwise slot 25 in which the pin 24 extends and the slot is formed with a cam portion 26ª extending about the center of the pivot 23 but slightly eccentric thereto so as to have a camming action to slightly move the sash away from the frame during the initial opening movement of the sash and to tighten it against the frame during the final movement of the operating member or lever 22 to its position shown in Figure 4. The pivot points 23, 24 are located in substantially a horizontal line and the pivot 23 out of line with the slot 25 so that the lever 22 is an angle lever or a lever having a short angular arm at its pivoted end.

In operation, the operator first takes hold of the handle 26 at the lower end of the lever or link 22 and swings the lever upwardly and inwardly about the pivot 23, and this movement, due to the cam formation of the slot, slightly moves the sash outwardly or breaks it away from the frame. When the lever has been moved to horizontal position, it is moved in such position that the fulcrum pin 24 is out of the cam portion of the slot and in line with the lengthwise portion so that by pushing the lever endwise outwardly, the sash will be swung to its open position. When it is moved to its open position, it may be held in such position by tightening a wing nut 27 threading on the fulcrum pin 24. To close the window, the reverse of this operation takes place and during the movement of the lever 22 to its initial position, the sash is moved tightly into closed position against the frame or the weather strip 28 and locked therein without necessarily tightening the wing nut.

By my window, the interior of the automobile can be ventilated when the vehicle is in motion without creating a draft as due to the outward and rearward incline of the window when open, a suction is created at the rear end of the window which draws the air out of the interior of the vehicle body but the draft is not felt by the occupant. When the window is closed, ventilation can be had by moving the slide 15 to open the slots 12 so that air is deflected through the slots 12 and 13 by the scoop 14.

What I claim is:

1. The combination with an automobile body having a window opening in the side thereof, of a window construction comprising a frame arranged to be set into said opening and formed with upper and lower laterally extending weather plates, a sash pivotally connected on an upright axis at its front end to the frame and movable laterally inwardly and outwardly between the weather plates and means for operating the sash.

2. The combination with an automobile body having a window opening in the side thereof, of a window construction comprising a frame arranged to be set into said opening and formed with upper and lower laterally extending weather plates, a sash pivotally connected on an upright axis at its front end to the frame and movable laterally inwardly and outwardly between the weather plates and means for operating the sash, said means being carried by the frame and including an operating member located on the inner side of the frame and self-contained therewith.

3. The combination with an automobile body having an opening in one side thereof, a window construction comprising a frame arranged to be set into said opening and formed with upper and lower laterally extending weather plates, a sash pivotally connected on an upright axis at its front end to the frame and movable laterally inwardly and outwardly between the weather plates and means for operating the sash including a link pivoted near one end to the sash and having a lengthwise slot, a pin on the frame extending into the slot.

4. The combination with an automobile body having an opening in one side thereof, a window construction comprising a frame arranged to be set into said opening and formed with upper and lower laterally extending weather plates, a sash pivotally connected on an upright axis at its front end to the frame and movable laterally inwardly and outwardly between the weather plates and means for operating the sash including a link pivoted near one end to the sash and having a lengthwise slot, a pin on the frame extending into the slot, the slot having a cam portion arranged slightly eccentric to the axis of the pivot between the link and the sash.

5. The combination with an automobile body having a window opening in one side thereof, a sash pivoted at its front end in said opening whereby its rear end swings outwardly and inwardly, ventilating openings in front of the pivot of the sash, and deflectors for directing the air coming through said openings toward the interior of the vehicle.

6. The combination with an automobile body having a window opening in one side thereof, a sash pivoted at its front end in said opening whereby its rear end swings outwardly and inwardly, ventilating openings in front of the pivot of the sash, deflectors for directing the air coming through said openings toward the interior of the vehicle, scoops on the outside of the vehicle for directing air through the openings and means for opening and closing the openings.

7. The combination of an automobile body having a window opening in one side thereof, of a unitary window construction comprising a frame in said opening, a sash pivoted at its front end in said frame on a vertical axis, whereby its rear end is movable laterally, the front upright member of the frame being formed with ventilator openings along the front pivoted edge of the sash.

8. The combination of an automobile body having a window opening in one side thereof, of a unitary window construction comprising a frame in said opening, a sash pivoted at its front end in said frame on a vertical axis, whereby its rear end is movable laterally, upper and lower weather plates arranged to close the space between the upper and lower edges of the sash and the body and the frame when the sash is swung open, the front upright member of the frame being formed with ventilator openings along the front pivoted edge of the sash.

9. The combination of an automobile body having a window opening in one side thereof, of a window construction comprising a frame in said opening, a sash pivoted at its front end in said frame on a vertical axis, whereby its rear end is movable laterally, upper and lower weather plates arranged to close the space between the upper and lower edges of the sash and the body and the frame when the sash is swung open, the front upright member of the frame being formed with ventilator openings along the front pivoted edge of the sash, and means for diffusing the air entering through said openings.

10. The combination with an automobile body having a window opening in the side thereof, of a window construction in said opening including a sash pivoted at its front end on an upright axis, whereby its rear end is movable laterally outwardly, and upper and lower laterally extending weather plates to close the space between the upper and lower edges of the sash and the body, ventilator openings provided along the front pivoted edge of the sash near the same, and means for diffusing the air entering said openings.

In testimony whereof, I have hereunto signed my name, at Syracuse, in the county of Onondaga, and in the State of New York, this 29th day of June, 1927.

OLIVER M. EDWARDS.